United States Patent
Edwards et al.

(10) Patent No.: US 10,310,655 B1
(45) Date of Patent: Jun. 4, 2019

(54) HEATED ATM TOUCH SCREEN

(71) Applicant: Capital One Services, LLC, McLean, VA (US)

(72) Inventors: Joshua Edwards, Philadelphia, PA (US); Abdelkadar M'Hamed Benkreira, Washington, DC (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/005,303

(22) Filed: Jun. 11, 2018

(51) Int. Cl.
*G06F 3/041* (2006.01)
*G06Q 20/10* (2012.01)
*G06F 3/0488* (2013.01)
*G05D 23/19* (2006.01)

(52) U.S. Cl.
CPC ....... *G06F 3/0412* (2013.01); *G05D 23/1917* (2013.01); *G05D 23/1927* (2013.01); *G06F 3/0416* (2013.01); *G06F 3/0488* (2013.01); *G06Q 20/1085* (2013.01)

(58) Field of Classification Search
CPC .... G06F 3/0412; G06F 3/0416; G06F 3/0488; G05D 23/1917; G05D 23/1927
See application file for complete search history.

(56) References Cited

U.S. PATENT DOCUMENTS

| | | | | |
|---|---|---|---|---|
| 6,163,359 A * | 12/2000 | Smith | ............... | G02F 1/133382 349/150 |
| 6,427,369 B1 * | 8/2002 | Durinzi, Jr. | ............. | G09F 13/04 362/812 |
| 8,573,479 B1 * | 11/2013 | Jenkins | ................. | G07F 19/201 235/379 |

(Continued)

FOREIGN PATENT DOCUMENTS

| | | | | |
|---|---|---|---|---|
| JP | H06162317 A | * | 6/1994 | |
| JP | 2011253383 A | * | 12/2011 | |
| KR | 1020120077856 A | * | 7/2012 | |

OTHER PUBLICATIONS

Kim, An ATM Equipped with Plat Type Heating Elements, Jul. 10, 2012, KR1020120077856A, Whole Document.*
Masafumi et al., Automatic Transaction Machine, Dec. 15, 2011, JP2011253383A, Whole Document.*
Takahashi et al., Startup-Time Heating Device of Automatic Cash Dispenser or the Like, Jun. 10, 1994, JPH06162317A, Whole Document.*
The Times of India, "Warm clothes, heaters for ATMs in Lahaul-Spiti", https://timesofindia.indiatimes.com/city/shimla/warm-clothes-heaters-for-atms-in-lahaul-spiti/articleshowpint/62423279.cms, Jan. 9, 2018, 1 page.

(Continued)

*Primary Examiner* — Larry L Furdge
(74) *Attorney, Agent, or Firm* — Harrity & Harrity, LLP

(57) ABSTRACT

An ATM device may include an external frame, a touch screen component coupled to the external frame, and a heating element. The heating element may be positioned such that heat generated by the heating element is directed at the touch screen component. The ATM device may include a temperature sensor configured to detect a temperature of an environment of the ATM device, and may receive temperature measurement data from the temperature sensor, process the temperature measurement data after receiving the temperature measurement data, determine whether the temperature measurement data indicates that a current temperature of the environment satisfies a threshold based on processing the temperature measurement data, and perform an action to control an operating state of the heating element based on determining whether the temperature measurement data indicates that the current temperature of the environment satisfies the threshold.

20 Claims, 9 Drawing Sheets

(56) References Cited

U.S. PATENT DOCUMENTS

| | | | |
|---|---|---|---|
| 2003/0132288 A1* | 7/2003 | Fulcher | G06Q 30/0284 235/381 |
| 2007/0170174 A1* | 7/2007 | Segiet | G07F 9/105 219/621 |
| 2010/0119249 A1* | 5/2010 | Asaka | G03G 15/5004 399/70 |
| 2012/0169614 A1* | 7/2012 | Oberpriller | G06F 1/1656 345/173 |

* cited by examiner

HEATED ATM TOUCH SCREEN

BACKGROUND

An automated teller machine (ATM) is an electronic device that enables users to perform transactions, such as withdrawing or depositing cash, obtaining account data, and/or the like, without needing to interact with other people. Many ATM devices include user interface hardware, such as touch screen components.

SUMMARY

According to some possible implementations, an ATM device may include an external frame, a touch screen component coupled to the external frame, and a heating element. The heating element may be positioned such that heat generated by the heating element is directed at the touch screen component. The ATM device may include a temperature sensor configured to detect a temperature of an environment of the ATM device, and one or more processors, communicatively coupled to the heating element and the temperature sensor, configured to receive temperature measurement data from the temperature sensor, process the temperature measurement data after receiving the temperature measurement data, determine whether the temperature measurement data indicates that a current temperature of the environment satisfies a threshold based on processing the temperature measurement data, and perform an action to control an operating state of the heating element based on determining whether the temperature measurement data indicates that the current temperature of the environment satisfies the threshold.

According to some possible implementations, an ATM device may include an electronic equipment chamber and a touch screen component. A front portion of the touch screen component may be exposed through an opening in the electronic equipment chamber. The ATM device may include a heating element disposed in the electronic equipment chamber. The heating element may be oriented such that heat generated by the heating element is directed at a rear portion of the touch screen component. The ATM device may include a temperature sensor configured to detect a temperature of an environment of the ATM device, and one or more processors, communicatively coupled to the heating element and the temperature sensor, configured to receive temperature measurement data from the temperature sensor, process the temperature measurement data after receiving the temperature measurement data, determine whether the temperature measurement data indicates that a current temperature of the environment satisfies a threshold based on processing the temperature measurement data, and perform an action to control an operating state of the heating element based on determining whether the temperature measurement data indicates that the current temperature of the environment satisfies the threshold.

According to some possible implementations, a method may include receiving, by a device, temperature measurement data from a temperature sensor, or temperature information from an external server device. The temperature sensor may be disposed on or within an ATM device, and positioned to detect a temperature associated with a touch screen component of the ATM device. The method may include processing, by the device, the temperature measurement data, or the temperature information, after receiving the temperature measurement data or the temperature information, determining, by the device, whether the temperature measurement data, or the temperature information, indicates that a current temperature of the touch screen component satisfies a threshold based on processing the temperature measurement data or the temperature information, and setting, by the device, a heating element to turn on the heating element, or to turn off the heating element, based on determining whether the temperature measurement data, or the temperature information, indicates that the current temperature satisfies the threshold. The heating element may be disposed within the ATM device.

DETAILED DESCRIPTION

Figure 1A:
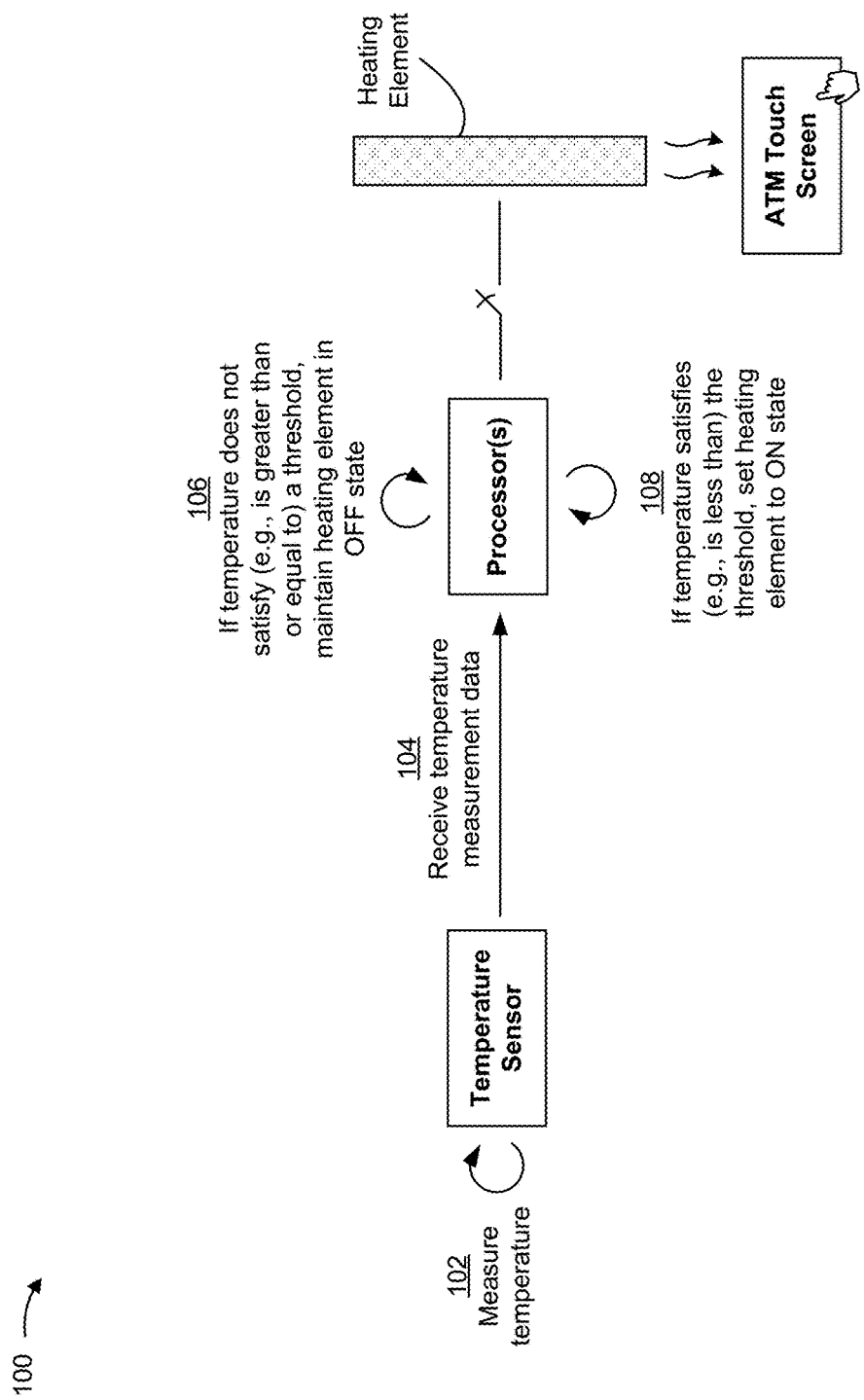
FIGS. 1A-1E are diagrams of an example implementation described herein.

The following detailed description of example implementations refers to the accompanying drawings. The same reference numbers in different drawings may identify the same or similar elements.

Touch screens do not function properly in cold temperatures, and yet many ATM devices, that include touch screens, are deployed in environments that are subject to extremely cold temperature conditions. This can result in an ATM device not performing desired operations, which is wasteful of ATM device resources. This can also result in user frustration, in addition to user discomfort, when interacting with an ATM device in the cold.

Some implementations, described herein, provide an ATM device that includes one or more heating elements configured to provide heat to component(s) of the ATM device, such as a touch screen and/or the like, under cold temperature conditions. In some implementations, the heating element(s) are positioned within or on a frame (or enclosure) of the ATM device, and oriented such that heat generated by the heating element(s) is directed at the touch screen. In some implementations, the ATM device may include one or more temperature sensors that provide temperature measurements, or may receive temperature information from an external source, for regulating the operation of the heating element(s).

In this way, component(s) of an ATM device, such as a touch screen and/or the like, may remain functional under cold temperature conditions. Heat generated by the heating element(s) also serves to warm a user's hands during use of the ATM device, which improves user comfort and user experience. In addition, this avoids potential damage to the ATM device that may otherwise result from user frustration with a slow responding, or non-functioning, system in cold temperatures, thereby conserving costs associated with repairing, maintaining, and/or replacing the ATM device. Regulating the operation of the heating element(s) based on temperature also prevents damage to the touch screen (e.g., due to overheating), and conserves power resources, under warmer temperature conditions, when no heating of the component(s) of the ATM device may be needed. Furthermore, ensuring proper functioning of the touch screen, based on temperature conditions, reduces or eliminates the possibility of the ATM device performing improper operations, which conserves ATM device resources that would otherwise be wasted performing such improper operations.

FIGS. 1A-1E are diagrams of an example implementation 100 described herein. Example implementation 100 may include an ATM device having a temperature sensor, a processor, and a heating element. The ATM device may be implemented in any configuration, such as in a configuration in which the ATM device is fully disposed outside of a building structure, in a configuration in which the ATM device is partially disposed outside of a building structure (e.g., in a through-the-wall configuration), and/or the like. The ATM device may include a touch screen with which a user may interact to conduct ATM transactions, such as withdrawing cash, depositing cash, obtaining account information, and/or the like.

In some implementations, the processor may include one or more processors that are configured to perform ATM transactions. Alternatively, and in some implementations, the processor may include one or more processors that are distinct from the processor(s) configured to perform ATM transactions—that is, for example, the processor may include standalone processing components that are configured to perform other functions, such as communicating with the temperature sensor and/or the heating element. The temperature sensor may include one or more temperature sensors that include a thermistor, a thermocouple, a resistance temperature detector (RTD), a semiconductor-based thermometer, an infrared-based thermometer, and/or the like. The heating element may include one or more heating elements, such as one or more electric heaters (e.g., electric lamps (e.g., infrared-based light sources, halogen-based light sources, and/or the like) and/or the like), convective-based heating devices, and/or the like.

As shown in FIG. 1A, and as shown by reference number 102, the temperature sensor may perform temperature measurements. In some implementations, the temperature sensor may be positioned so as to permit temperature measurements of an environment of the ATM device. For example, the temperature sensor may be positioned on a portion of a frame of the ATM device (e.g., on a side panel of the frame, on a top panel of the frame, and/or the like), positioned within the frame of the ATM device (e.g., within an electronic equipment chamber of the ATM device, within a vault area of the ATM device, and/or the like), positioned on the touch screen of the ATM device, positioned within the touch screen (e.g., within an enclosure of the touch screen), and/or the like. In some implementations, the ATM device may include multiple temperature sensors disposed in various locations on or within the frame of the ATM device. In some implementations, and in a case where the temperature sensor includes an infrared-based thermometer, the temperature sensor may be positioned proximate to the touch screen (e.g., on or within the frame of the ATM device), and directed at (e.g., pointing toward) the touch screen, so as to measure a temperature at or near the touch screen.

As shown by reference number 104, the processor may receive temperature measurement data from the temperature sensor. For example, the processor may receive the temperature measurement data periodically, continuously, based on user input, based on an event (e.g., based on detection of a user being present at or near the ATM device), and/or the like. In some implementations, the processor may regulate or control the heating element based on the temperature measurement data. For example, as shown by reference number 106, if the temperature measurement data indicates that a current temperature does not satisfy (e.g., is greater than or equal to) a threshold, and the heating element is presently turned off (e.g., is in an OFF state), the processor may maintain the heating element in the OFF state. Continuing the example, in a case where the heating element is presently turned on (e.g., is in an ON state), the processor may cause the heating element to be turned off.

As another example, and as shown by reference number 108, if the temperature measurement data indicates that a current temperature satisfies (e.g., is below) the threshold, and the heating element is presently in the OFF state, the processor may set the heating element to the ON state. Continuing the example, in a case where the heating element is presently turned on, the processor may maintain the heating element in the ON state.

In various implementations, the processor may cause the heating element to be turned on or off by controlling one or more switches—e.g., to selectively couple the heating element to one or more power sources or decouple the heating element from the power source(s) (not shown). In some implementations, a processor may or may not be needed to control the operation of the heating element. For example, in some implementations, the temperature sensor may be configured to directly control the operation (e.g., using one or more switches) of the heating element based on temperature measurements made by the temperature sensor. In this case, the temperature sensor may function as a processor and perform one or more functions described herein as being performed by the processor.

In some implementations, the processor may control the heating element based on a current temperature satisfying one of multiple temperature thresholds or being within one of multiple temperature ranges. In some implementations, the processor may turn on the heating element at different power intensities, and permit the heating element to remain turned on for different durations, depending on which temperature threshold or range is satisfied. For example, the processor may cause the heating element to turn on at low power for a short period of time if the current temperature is within an upper temperature range (e.g., is about 45 degrees ° F. (about 7.2° C.) or higher and/or the like), turn on at medium power for a longer period of time if the current temperature is within a medium temperature range (e.g., is between about 45 degrees ° F. (about 7.2° C.) and about 30 degrees ° F. (about −1.11° C.) and/or the like), turn on at high power for an even longer period of time if the current temperature is within a lower temperature range (e.g., is about 30 degrees ° F. (about −1.11° C.) or lower and/or the like), and/or the like. In some implementations, different temperature thresholds or ranges may be employed for controlling the heating element, depending on physical properties and/or temperature-related constraints of one or more internal components of the touch screen. In some implementations, and in a case where the heating element includes multiple heating elements (e.g., as described in more detail below in connection with FIGS. 1B-1E), the processor may selectively turn on one heating element and turn off another heating element, based on which temperature threshold or range is satisfied.

In some implementations, the processor may additionally control the operating state of the heating element based on one or more other criteria. As one example, the ATM device may include a card reading mechanism, in which case the processor may cause the heating element to turn on based on a user inserting a transaction card into, or swiping a transaction card through, the card reading mechanism. As another example, the ATM device may include a keypad, in which case the processor may cause the heating element to turn on based on an input to (e.g., a key being pressed on) the keypad. As yet another example, the ATM device may include an image capturing component (e.g., a camera and/or the like), in which case the processor may cause the heating element to turn on based on the image capturing component capturing an image of a user's face (e.g., an image of a user looking at the touch screen). As a further example, the ATM device may include a motion sensor, in which case the processor may cause the heating element to turn on based on the motion sensor detecting motion in close proximity to (e.g., within a threshold distance from) the ATM device. As an additional example, the ATM device may include a sensor component disposed at a lower portion of the ATM device, in which case the processor may cause the heating element to turn on based on the sensor component detecting a user's feet (e.g., a user's two feet). Employing such control of the heating element, in combination with temperature conditions, enables conservation of ATM device resources (e.g., power resources needed to operate the heating element) that would otherwise be wasted when no one is around to use the ATM device.

In some implementations, temperature measurements made by the temperature sensor may be provided (e.g., periodically, continuously, based on user input, and/or the like) to an external server device for collection and/or statistical analysis. This enables a financial institution, that deploys a network of ATM devices across a large geographical area (e.g., across multiple cities, states, provinces, and/or the like) to identify temperature patterns, and determine whether implementations of ATM devices, described herein are appropriate for certain areas, and/or the like.

In some implementations, the ATM device (and/or an external management device configured to provide control signals to the ATM device) may use one or more machine learning algorithms configured to predict usage, or demand for usage, of the ATM device. For example, in some implementations, the ATM device (and/or the external management device) may provide information regarding historical usage of the ATM device as input to one or more machine learning algorithms, which may perform machine learning to automate future determinations or predictions of usage, or demand for usage, of the ATM device. For example, the ATM device (and/or the external management device) may train a machine learning algorithm based on known inputs (e.g., information regarding user activity associated with the ATM device, times of day during which there is typically activity associated with the ATM device, temperature or other weather-related information associated with the ATM device, information regarding a location of the ATM device, and/or the like) and known outputs (e.g., actual usage, or actual demand for usage, of the ATM device and/or the like). In some implementations, the ATM device (and/or the external management device) may refine a machine learning algorithm based on feedback received from a user of the ATM device, a user of the external management device, and/or the like. For example, a user may provide information indicating whether predictions of usage, or demand for usage, of the ATM device, made by the machine learning algorithm, are accurate and/or helpful. When the information indicates that a particular prediction is accurate and/or helpful, the ATM device (and/or the external management device) may configure the machine learning algorithm to make predictions of future usage, or demand for usage, of the ATM device, based on the particular prediction. When the information indicates that the particular prediction is not accurate or helpful, the ATM device (and/or the external management device) may configure the machine learning algorithm to avoid predicting usage, or demand for usage, of the ATM device in a manner in which the particular prediction was made. In this way, the ATM device (and/or the external management device) may predict usage, or demand for usage, of the ATM device based on a machine learning algorithm, which improves the accuracy of the predictions, and conserves processor and/or storage resources that may otherwise be used to generate and store rules for predicting future usage, or demand for usage, of the ATM device.

In some implementations, the ATM device may include a communication interface that permits the ATM device (e.g., the processor) to communicate with an external server device (e.g., via one or more application programming interfaces (APIs) and/or the like) to receive weather data (e.g., temperature information) for a geographical area in which the ATM device is located, and regulate the operation of the heating element based on such data. Additionally, or alternatively, the ATM device may communicate with one or more nearby ATM devices to receive nearby temperature information. In this way, the ATM device may regulate the operation of the heating element even in a case where the temperature sensor of the ATM device has malfunctioned, has been damaged, and/or the like. In some implementations, and in cases where externally-provided temperature information is being relied upon to control the heating element, the processor may permit the heating element to turn on for only a limited amount of time (e.g., for 20 minutes, 25 minutes, 30 minutes, and/or the like) so as to avoid overheating the ATM device, the touch screen, and/or the like. Alternatively, the processor may monitor (e.g., periodically, continuously, based on user input, and/or the like) such externally-received temperature information to determine whether to turn the heating element on or off.

Figure 1B:
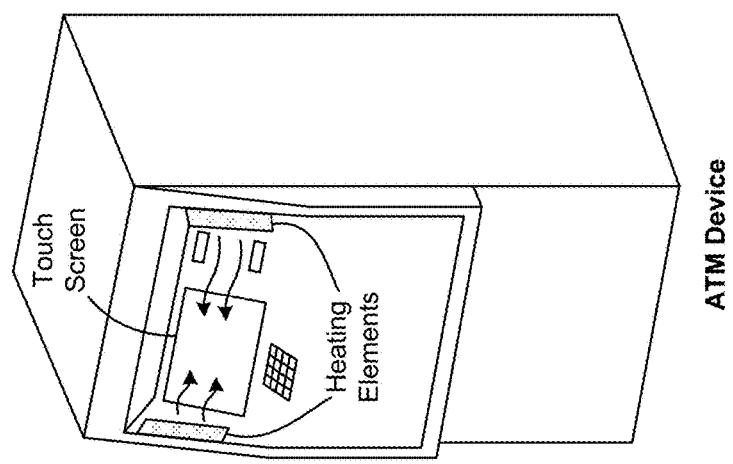

As shown in FIG. 1B, and in some implementations, the ATM device may include heating element(s) coupled to, or integrated into, one or more side panels of the frame of the ATM device. In some implementations, the heating element(s) may be positioned or oriented (e.g., may protrude) such that heat generated by the heating element(s) is directed toward the touch screen so as to warm the touch screen during cold temperatures.

Figure 1C:
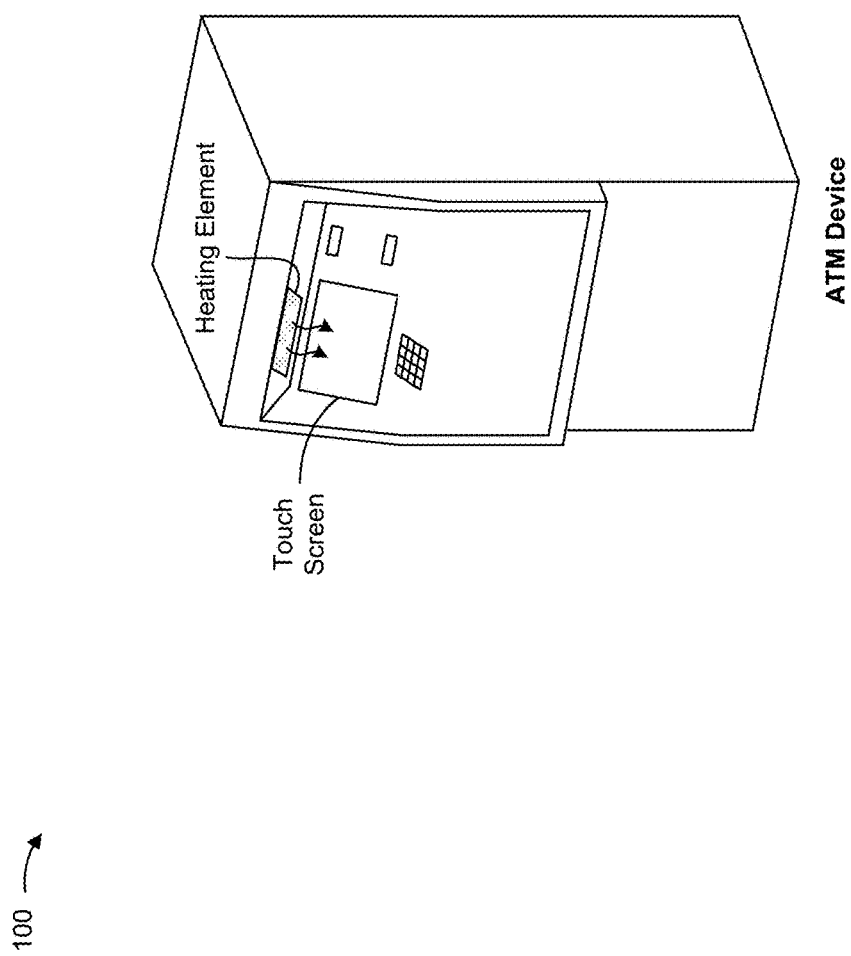

Additionally, or alternatively, and as shown in FIG. 1C, the ATM device may include heating element(s) coupled to, or integrated into, a top panel of the frame of the ATM device. In some implementations, and similar to example implementation 100 of FIG. 1B, the heating element(s) may be positioned or oriented (e.g., may protrude) such that heat generated by the heating element(s) is directed toward the touch screen.

Figure 1D:
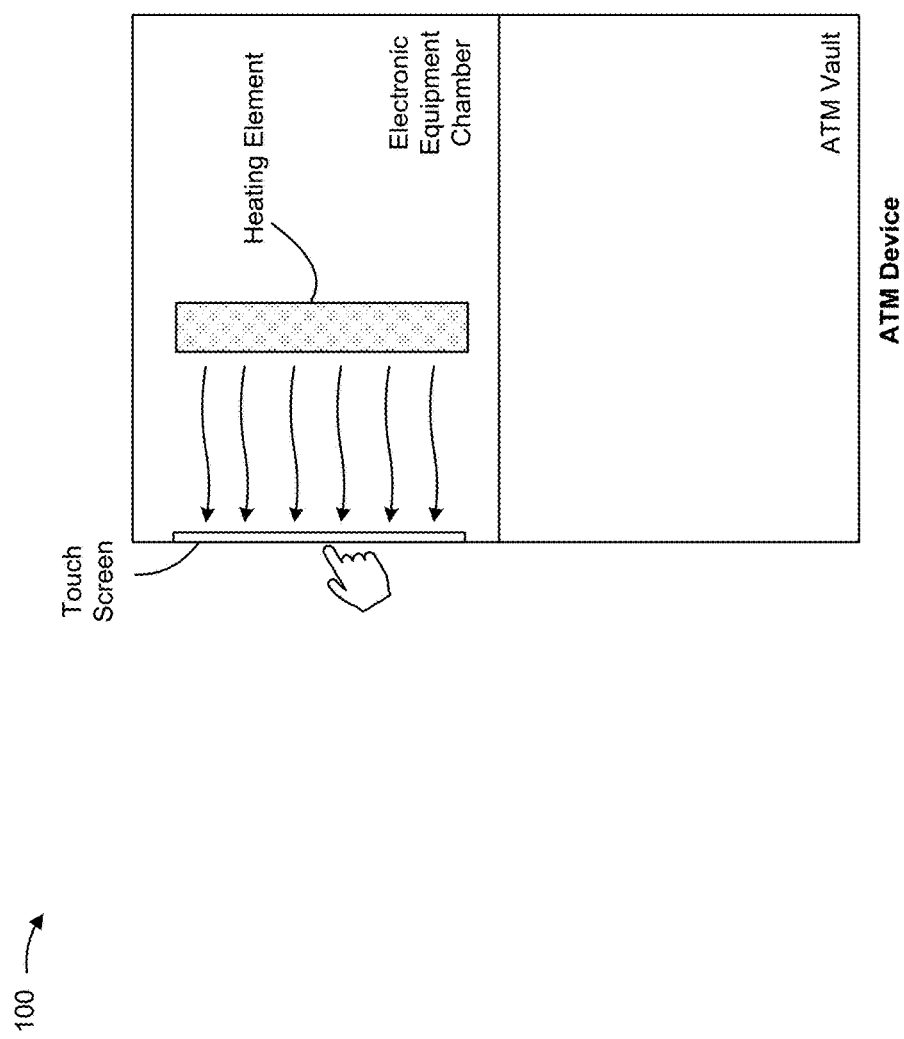

Additionally, or alternatively, and as shown in FIG. 1D, the ATM device may include heating element(s) disposed within an electrical equipment chamber of the ATM device. As shown, the heating element(s) may be positioned or oriented such that heat generated by the heating element(s) is directed toward a rear portion, or surface, of the touch screen.

Figure 1E:
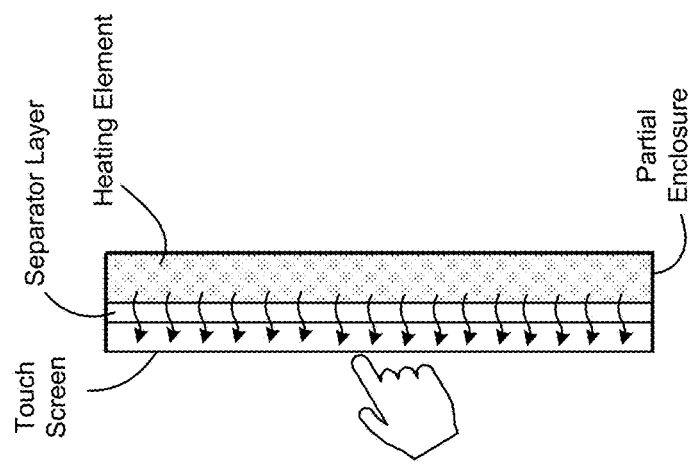

Additionally or alternatively, and as shown in FIG. 1E, the ATM device may include heating element(s) disposed within an enclosure, or encasement, that partially encloses the touch screen. As shown, the heating element(s) may be disposed proximate to the touch screen, but may be separated from the touch screen by a separator layer (e.g., a layer composed of glass, plastic, metal, and/or the like) that can function as a temperature control barrier between the heating element(s) and the touch screen. Here, and similar to example implementation 100 of FIG. 1D, heat generated by the heating element(s) may be directed toward a rear portion, or surface, of the touch screen.

In this way, component(s) of an ATM device, such as a touch screen and/or the like, may remain functional under cold temperature conditions. Heat generated by the heating element(s) also serves to warm a user's hands during use of the ATM device, which improves user comfort and user experience. In addition, this avoids potential damage to the ATM device that may otherwise result from user frustration with a slow responding, or non-functioning, system in cold temperatures, thereby conserving costs associated with repairing, maintaining, and/or replacing the ATM device. Regulating the operation of the heating element(s) based on temperature also prevents damage to the touch screen (e.g., due to overheating), and conserves power resources, under warmer temperature conditions, when no heating of the component(s) of the ATM device may be needed.

As indicated above, FIGS. 1A-1E are provided merely as examples. Other examples are possible and may differ from what was described with regard to FIGS. 1A-1E. For example, in some implementations, an ATM device may not include a touch screen, but may include other input device(s), such as a keypad and/or the like, for users to interact with the ATM device. In such cases, the ATM device may include heating element(s) disposed on or within the ATM device, and oriented such that heat generated by the heating element(s) is directed to the input device(s), which may warm an area where a user's hands may be positioned when interacting with the ATM device. In addition, although implementations are described herein as being applicable to ATM devices, the implementations apply equally, or similarly, to other types of devices or machines that solicit user interaction, such as vending machines, parking facility-related devices or machines, and/or the like.

Figure 2:
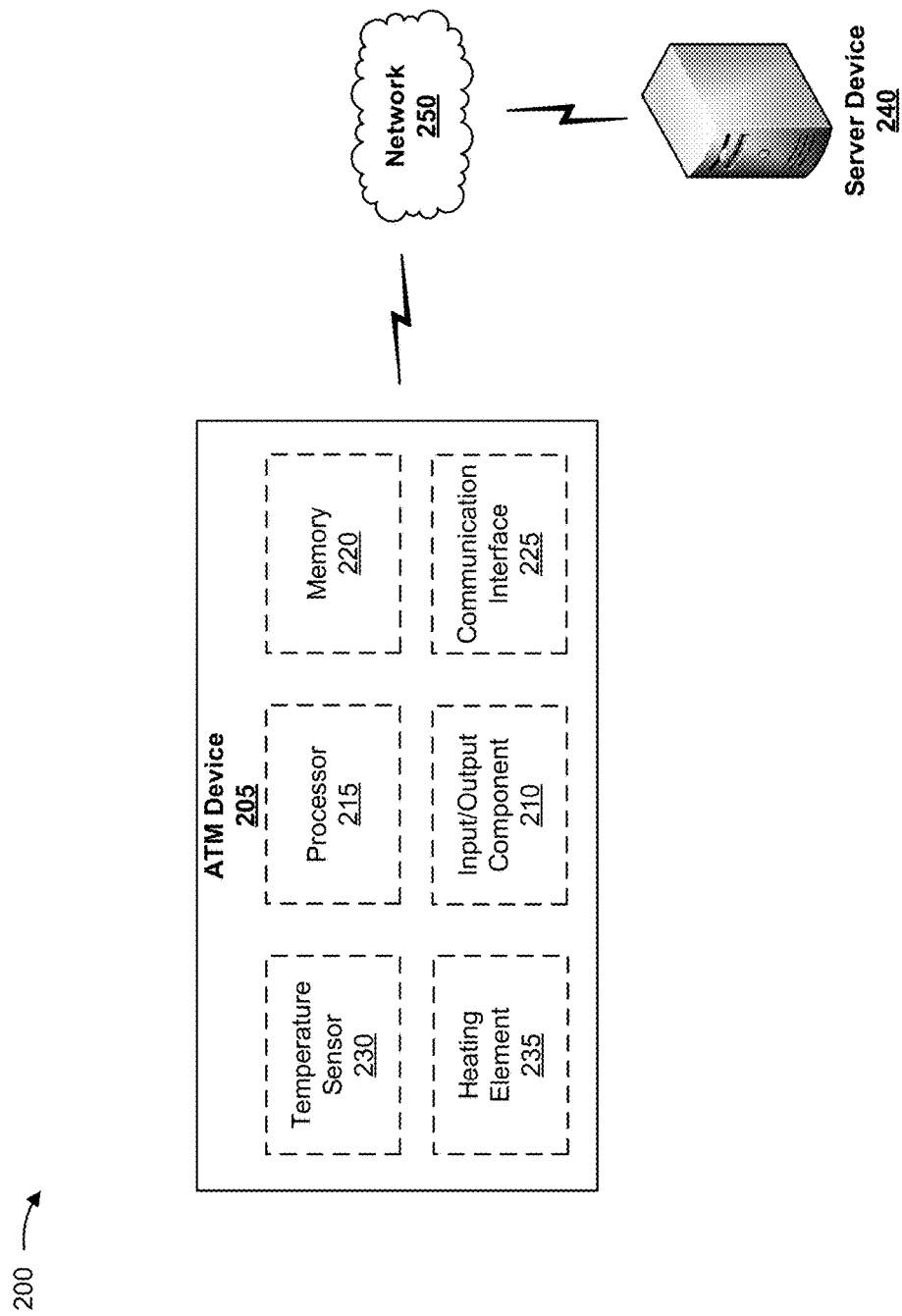
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an ATM device 205 having an input/output component 210, a processor 215, a memory 220, a communication interface 225, a temperature sensor 230, and a heating element 235. Environment 200 may also include a server device 240 and a network 250. Devices of environment 200 may interconnect via wired connections, wireless connections, or a combination of wired and wireless connections.

ATM device 205 includes one or more devices capable of performing various types of financial transactions, such as a cash withdrawal, a money deposit (e.g., a check or cash deposit), a money transfer (e.g., a transfer from one bank account to another bank account), access to information related to an account (e.g., a bank account, a checking account, a credit card account, etc.), and/or the like. For example, ATM device 205 may include an ATM, an automated banking machine (ABM), a cash point, a Cashline®, a Minibank®, a cash machine, a Tyme® machine, a cash dispenser, a Bankomat®, a Bancomat®, and/or a similar type of device.

Input/output component 210 includes one or more components capable of being used to input information into, and/or output information from, ATM device 205. In some implementations, input/output component 210 may include one or more touch screen components, one or more keypads, and/or the like. In some implementations, input/output component 210 may correspond to an input component and an output component, described in more detail below in connection with FIG. 3.

Processor 215 includes one or more types of processing components capable of being programmed to perform a function, such as one or more operations described elsewhere herein. For example, processor 215 may perform process 400 of FIG. 4, process 500 of FIG. 5, and/or the like. In some implementations, processor 215 may be configured to receive temperature measurement data from temperature sensor 230, and regulate or control the operation of heating element 235 based on the temperature measurement data, as described elsewhere herein. In some implementations, processor 215 may correspond to a processor, described in more detail below in connection with FIG. 3.

Memory 220 includes one or more types of memories capable of storing information. In some implementations, memory 220 may store information associated with performing one or more operations described elsewhere herein. For example, memory 220 may store information to be used (e.g., by processor 215) to perform process 400 of FIG. 4, process 500 of FIG. 5, and/or the like. In some implementations, memory 220 may correspond to a memory or storage component, described in more detail below in connection with FIG. 3.

Communication interface 225 includes one or more types of communication interfaces that allow ATM device 205 to communicate with other devices (e.g., server device 240, another ATM device 205, and/or the like), such as via a wired connection, a wireless connection, or a combination of wired and wireless connections. For example, communication interface 225 may be used to read information from a transaction card, to transmit information to, or receive information from a card validation device and/or a server device, such as server device 240, and/or the like. In some implementations, communication interface 225 may correspond to a communication interface, described in more detail below in connection with FIG. 3.

Temperature sensor 230 includes one or more temperature sensor components configured to sense a temperature of a surrounding environment. In some implementations, temperature sensor 230 may include a thermistor, such as a positive temperature coefficient (PTC)-type thermistor or a negative temperature coefficient (NTC)-type thermistor. In some implementations, temperature sensor 230 may include another type of temperature sensor component, such as a thermocouple, RTD, semiconductor-based thermometer, infrared-based thermometer, and/or the like. In some implementations, temperature sensor 230 may provide temperature measurement data to processor(s) (e.g., processor 215 of ATM device 205) for use with regulating the operation of heating element 235, as described elsewhere herein.

Heating element 235 includes one or more heating generating components that provide heat to a surrounding environment. Heating element 235 may include an electric-based heater, such as an electric light source (e.g., an infrared light source, a halogen light source, and/or the like), a convective-based heater, and/or the like. In some implementations, heating element 235 may turn on or off based on control signals provided by processor(s) (e.g., processor 215 of ATM device 205), as described elsewhere herein.

Server device 240 includes one or more devices capable of receiving, storing, providing, generating, and/or processing temperature information, usage information, and/or the like associated with ATM device 205. For example, server device 240 may include a server device or a group of server devices (e.g., associated with a multi-server micro data center), a workstation computer or a group of workstation computers, a virtual machine (VM) or a group of virtual machines (VMs) implemented by one or more computing devices provided in a cloud computing environment, or a similar type or group of devices. In some implementations, server device 240 may provide temperature information to ATM device 205 to enable ATM device 205 to control the operating state of one or more heating elements of ATM device 205, such as heating element 235, as described elsewhere herein. In some implementations, server device 240 may receive temperature measurement data, from ATM device 205, for monitoring and/or statistical analysis purposes, as described elsewhere herein.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
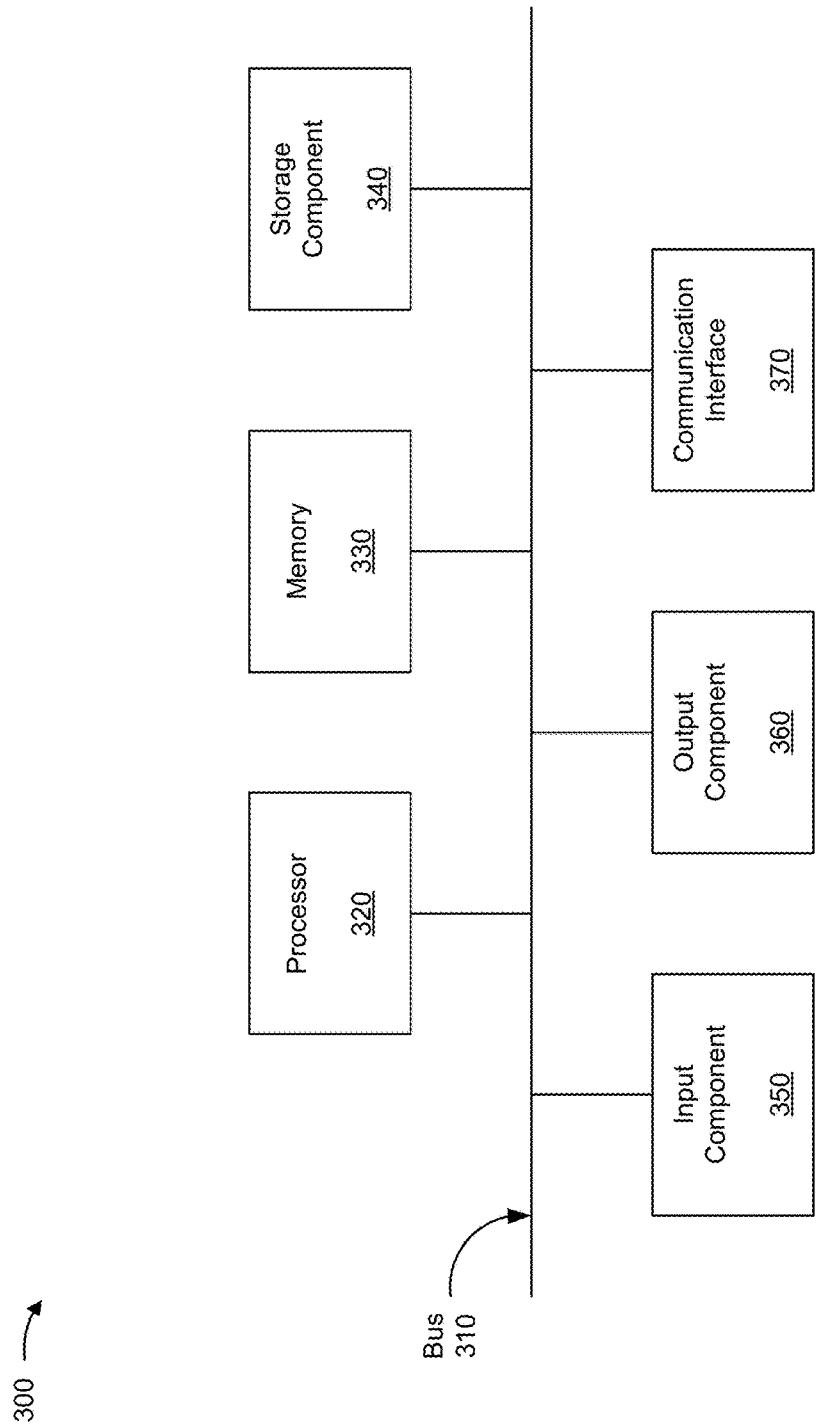
FIG. 3 is a diagram of example components of one or more devices of FIG. 2.

FIG. 3 is a diagram of example components of a device 300. Device 300 may correspond to ATM device 205 and/or server device 240. In some implementations, ATM device 205 and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
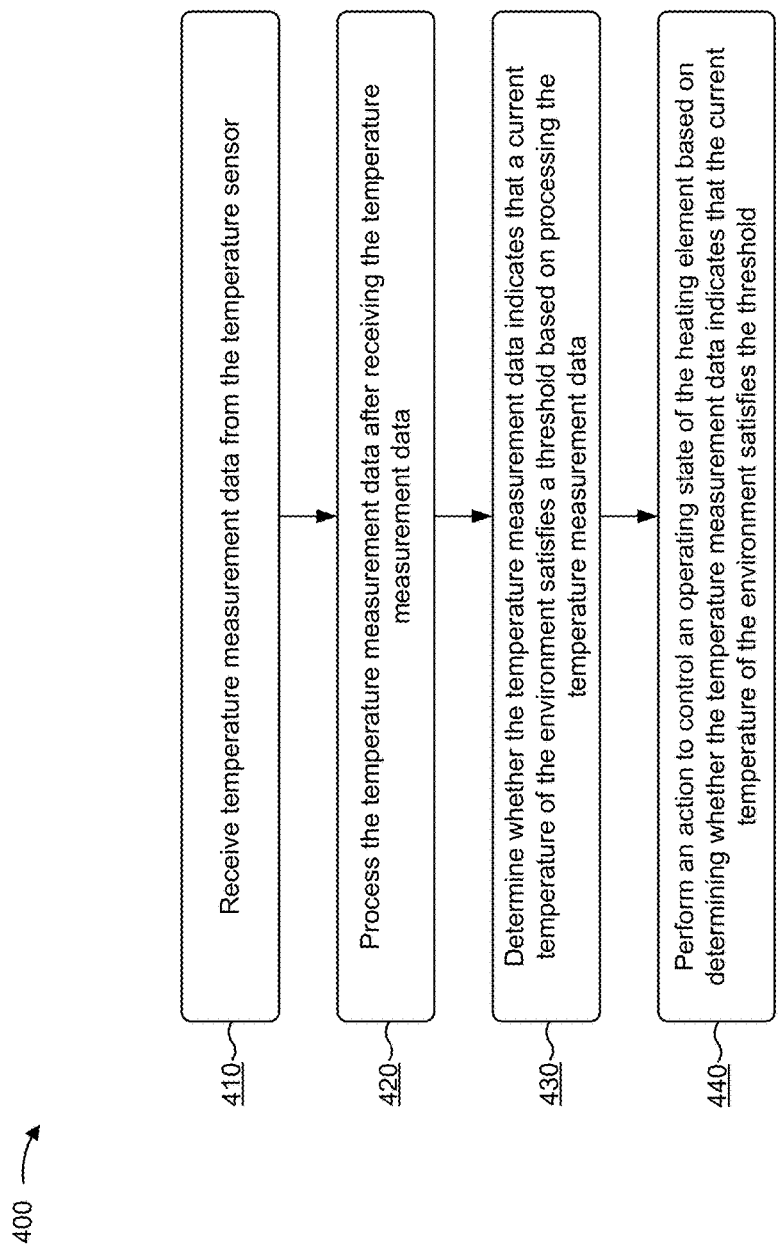
FIG. 4 is a flow chart of an example process for controlling heating element(s) of an ATM device.

FIG. 4 is a flow chart of an example process 400 for controlling heating element(s) of an ATM device. In some implementations, one or more process blocks of FIG. 4 may be performed by an ATM device (e.g., ATM device 205). In some implementations, one or more process blocks of FIG. 4 may be performed by another device or a group of devices separate from or including ATM device 205, such as server device 240. In some implementations, the ATM device may include an external frame, a touch screen component coupled to the external frame, and a heating element (e.g., heating element 235). The heating element may be positioned such that heat generated by the heating element is directed at the touch screen component. The ATM device may include a temperature sensor (e.g., temperature sensor 230) configured to detect a temperature of an environment of the ATM device, and one or more processors (e.g., processor 215), communicatively coupled to the heating element and the temperature sensor, configured to perform process 400.

As shown in FIG. 4, process 400 may include receiving temperature measurement data from the temperature sensor (block 410). For example, the ATM device (e.g., using processor 320, memory 330, storage component 340, input component 350, communication interface 370, and/or the like) may receive temperature measurement data from temperature sensor 230, as described above in connection with FIGS. 1A-1E.

As further shown in FIG. 4, process 400 may include processing the temperature measurement data after receiving the temperature measurement data (block 420). For example, the ATM device (e.g., using processor 320, memory 330, storage component 340, and/or the like) may process the temperature measurement data after receiving the temperature measurement data, as described above in connection with FIGS. 1A-1E.

As further shown in FIG. 4, process 400 may include determining whether the temperature measurement data indicates that a current temperature of the environment satisfies a threshold based on processing the temperature measurement data (block 430). For example, the ATM device (e.g., using processor 320, memory 330, storage component 340, and/or the like) may determine whether the temperature measurement data indicates that a current temperature of the environment satisfies a threshold based on processing the temperature measurement data, as described above in connection with FIGS. 1A-1E.

As further shown in FIG. 4, process 400 may include performing an action to control an operating state of the heating element based on determining whether the temperature measurement data indicates that the current temperature of the environment satisfies the threshold (block 440). For example, the ATM device (e.g., using processor 320, memory 330, storage component 340, output component 360, communication interface 370, and/or the like) may perform an action to control an operating state of the heating element based on determining whether the temperature measurement data indicates that the current temperature of the environment satisfies the threshold, as described above in connection with FIGS. 1A-1E.

Process 400 may include additional implementations, such as any single implementation or any combination of implementations described below and/or in connection with one or more other processes described elsewhere herein.

In some implementations, the one or more processors, when performing the action, may be configured to set the operating state of the heating element to turn on the heating element based on determining that the temperature measurement data indicates that the current temperature of the environment satisfies the threshold. In some implementations, the one or more processors, when performing the action, may be configured to set the operating state of the heating element to turn off the heating element based on determining that the temperature measurement data indicates that the current temperature of the environment does not satisfy the threshold.

In some implementations, the external frame may include a side panel. In some implementations, the heating element may be coupled to the side panel. In some implementations, the ATM device may include an additional heating element positioned such that heat generated by the additional heating element is directed at the touch screen component. In some implementations, the external frame may include a plurality of side panels. In some implementations, the heating element may be coupled to a first side panel of the plurality of side panels, and the additional heating element may be coupled to a second side panel of the plurality of side panels.

In some implementations, the external frame may include a top panel, and the heating element may be coupled to the top panel. In some implementations, the temperature sensor may include an infrared temperature sensor. In some implementations, the temperature sensor may be disposed on an outer surface of the external frame or on the touch screen component.

In some implementations, the ATM device may include an electronic equipment chamber. In some implementations, a front portion of the touch screen component may be exposed through an opening in the electronic equipment chamber. In some implementations, the heating element may be disposed in the electronic equipment chamber, and oriented such that heat generated by the heating element is directed at a rear portion of the touch screen component.

In some implementations, an ATM device (e.g., ATM device 205) may include an electronic equipment chamber, and a touch screen component. A front portion of the touch screen component may be exposed through an opening in the electronic equipment chamber. The ATM device may include a heating element (e.g., heating element 235) disposed in the electronic equipment chamber. The heating element may be oriented such that heat generated by the heating element is directed at a rear portion of the touch screen component. The ATM device may include a temperature sensor (e.g., temperature sensor 230) configured to detect a temperature of an environment of the ATM device, and one or more processors (e.g., processor 215), communicatively coupled to the heating element and the temperature sensor, configured to perform process 400.

In some implementations, the ATM device may include a communication interface configured to receive, from an external server device, temperature information relating to a geographical area at which the ATM device is located. In some implementations, the one or more processors may be further configured to determine that the temperature sensor is malfunctioning, cause the communication interface to receive the temperature information after determining that the temperature sensor is malfunctioning, and perform an additional action to control the operating state of the heating element based on the temperature information.

In some implementations, the one or more processors are further configured to provide information regarding the temperature measurement data to an external server device for statistical analysis on temperature patterns. In some implementations, the heating element may include an electric heater. In some implementations, the heating element may include a lamp.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
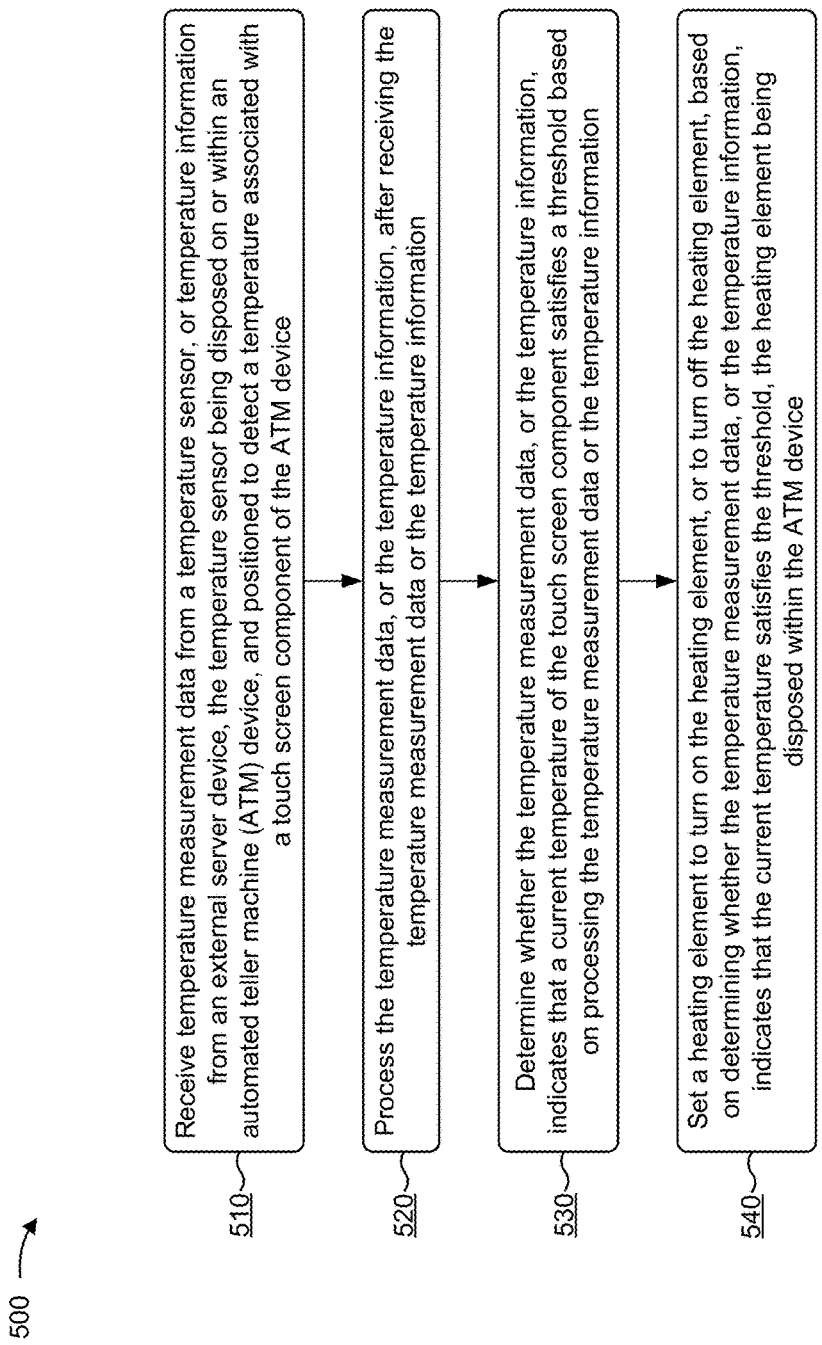
FIG. 5 is a flow chart of an example process for controlling heating element(s) of an ATM device.

FIG. 5 is a flow chart of an example process 500 for controlling heating element(s) of an ATM device. In some implementations, one or more process blocks of FIG. 5 may be performed by an ATM device (e.g., ATM device 205). In some implementations, one or more process blocks of FIG. 5 may be performed by another device or a group of devices separate from or including ATM device 205, such as server device 240.

As shown in FIG. 5, process 500 may include receiving temperature measurement data from a temperature sensor, or temperature information from an external server device (block 510). For example, the ATM device (e.g., using processor 320, memory 330, storage component 340, input component 350, communication interface 370, and/or the like) may receive temperature measurement data from a temperature sensor (e.g., temperature sensor 230), or temperature information from a server device (e.g., server device 240), as described above in connection with FIGS. 1A-1E. In some implementations, the temperature sensor may be disposed on or within the ATM device, and positioned to detect a temperature associated with a touch screen component of the ATM device.

As further shown in FIG. 5, process 500 may include processing the temperature measurement data, or the temperature information, after receiving the temperature measurement data or the temperature information (block 520). For example, the ATM device (e.g., using processor 320, memory 330, storage component 340, and/or the like) may process the temperature measurement data, or the temperature information, after receiving the temperature measurement data or the temperature information, as described above in connection with FIGS. 1A-1E.

As further shown in FIG. 5, process 500 may include determining whether the temperature measurement data, or the temperature information, indicates that a current temperature of the touch screen component satisfies a threshold based on processing the temperature measurement data or the temperature information (block 530). For example, the ATM device (e.g., using processor 320, memory 330, storage component 340, and/or the like) may determine whether the temperature measurement data, or the temperature information, indicates that a current temperature of the touch screen component satisfies a threshold based on processing the temperature measurement data or the temperature information, as described above in connection with FIGS. 1A-1E.

As further shown in FIG. 5, process 500 may include setting a heating element to turn on the heating element, or to turn off the heating element, based on determining whether the temperature measurement data, or the temperature information, indicates that the current temperature satisfies the threshold (block 540). For example, the ATM device (e.g., using processor 320, memory 330, storage component 340, and/or the like) may set a heating element (e.g., heating element 235) to turn on the heating element, or to turn off the heating element, based on determining whether the temperature measurement data, or the temperature information, indicates that the current temperature satisfies the threshold, as described above in connection with FIGS. 1A-1E. In some implementations, the heating element may be disposed within the ATM device.

Process 500 may include additional implementations, such as any single implementation or any combination of implementations described below and/or in connection with one or more other processes described elsewhere herein.

In some implementations, setting the heating element to turn on the heating element, or to off the heating element may include setting the heating element to turn on the heating element when the temperature measurement data, or the temperature information, indicates that the current temperature satisfies the threshold. In some implementations, the ATM device may initiate a timer upon setting the heating element to turn on the heating element or after setting the heating element to turn on the heating element, and set the heating element to turn off the heating element upon expiration of the timer or after expiration of the timer.

In some implementations, the heating element may be disposed proximate to a rear portion of the touch screen component within the ATM device, and oriented such that heat generated by the heating element is directed at the rear portion of the touch screen component. In some implementations, the ATM device may include a separator material disposed between the heating element and the rear portion of the touch screen component.

In some implementations, the ATM device may include a card reading mechanism configured to read transaction cards. In some implementations, the ATM device may control an operating state of the heating element based on a detection of a transaction card by the card reading mechanism. In some implementations, controlling the operating state may include, when the heating element is in an OFF state, maintaining the heating element in the OFF state if the card reading mechanism does not detect the transaction card.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Some implementations, described herein, provide an ATM device 205 that includes one or more heating elements 235 configured to provide heat to component(s) of ATM device 205, such as a touch screen and/or the like, under cold temperature conditions. In some implementations, heating element(s) 235 are positioned within or on a frame (or enclosure) of ATM device 205, and oriented such that heat generated by heating element(s) 235 is directed at the touch screen. In some implementations, ATM device 205 may include one or more temperature sensors 230 that provide temperature measurements, or may receive temperature information from an external source (e.g., server device 240), for regulating the operation of heating element(s) 235.

In this way, component(s) of an ATM device, such as a touch screen and/or the like, may remain functional under cold temperature conditions. Heat generated by the heating element(s) also serves to warm a user's hands during use of the ATM device, which improves user comfort and user experience. In addition, this avoids potential damage to the ATM device that may otherwise result from user frustration with a slow responding, or non-functioning, system in cold temperatures, thereby conserving costs associated with repairing, maintaining, and/or replacing the ATM device. Regulating the operation of the heating element(s) based on temperature also prevents damage to the touch screen (e.g., due to overheating), and conserves power resources, under warmer temperature conditions, when no heating of the component(s) of the ATM device may be needed.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. An automated teller machine (ATM) device, comprising:
   an external frame;
   a touch screen component coupled to the external frame;
   a heating element,
      the heating element being positioned such that heat generated by the heating element is directed at the touch screen component;
   a temperature sensor configured to detect a temperature of an environment of the ATM device;
   a communication interface configured to receive, from an external server device, temperature information relating to a geographical area at which the ATM device is located; and
   one or more processors, communicatively coupled to the heating element and the temperature sensor, configured to:
      receive temperature measurement data from the temperature sensor;
      process the temperature measurement data after receiving the temperature measurement data;
      determine whether the temperature measurement data indicates that a current temperature of the environment satisfies a threshold based on processing the temperature measurement data;
      perform an action to control an operating state of the heating element based on determining whether the temperature measurement data indicates that the current temperature of the environment satisfies the threshold;
      determine that the temperature sensor is malfunctioning;
      cause the communication interface to receive the temperature information after determining that the temperature sensor is malfunctioning; and
      perform an additional action to control the operating state of the heating element based on the temperature information.

2. The ATM device of claim 1, wherein the one or more processors, when performing the action, are configured to:
   set the operating state of the heating element to turn on the heating element based on determining that the temperature measurement data indicates that the current temperature of the environment satisfies the threshold.

3. The ATM device of claim 1, wherein the one or more processors, when performing the action, are configured to:
   set the operating state of the heating element to turn off the heating element based on determining that the temperature measurement data indicates that the current temperature of the environment does not satisfy the threshold.

4. The ATM device of claim 1, wherein the external frame includes a side panel; and
   wherein the heating element is coupled to the side panel.

5. The ATM device of claim 1, further comprising an additional heating element positioned such that heat generated by the additional heating element is directed at the touch screen component;
   wherein the external frame includes a plurality of side panels; and
   wherein the heating element is coupled to a first side panel of the plurality of side panels, and the additional heating element is coupled to a second side panel of the plurality of side panels.

6. The ATM device of claim 1, wherein the external frame includes a top panel; and
   wherein the heating element is coupled to the top panel.

7. The ATM device of claim 1, wherein the temperature sensor includes an infrared temperature sensor.

8. The ATM device of claim 1, wherein the temperature sensor is disposed on an outer surface of the external frame or on the touch screen component.

9. The ATM device of claim 1, further comprising an electronic equipment chamber;
   wherein a front portion of the touch screen component is exposed through an opening in the electronic equipment chamber; and
   wherein the heating element is disposed in the electronic equipment chamber, and oriented such that heat generated by the heating element is directed at a rear portion of the touch screen component.

10. An automated teller machine (ATM) device, comprising:
    an electronic equipment chamber;
    a touch screen component,
       a front portion of the touch screen component being exposed through an opening in the electronic equipment chamber;
    a heating element disposed in the electronic equipment chamber,
       the heating element being oriented such that heat generated by the heating element is directed at a rear portion of the touch screen component;
    a temperature sensor configured to detect a temperature of an environment of the ATM device;
    a communication interface configured to receive, from an external server device, temperature information relating to a geographical area at which the ATM device is located; and one or more processors, communicatively coupled to the heating element and the temperature sensor, configured to:
receive temperature measurement data from the temperature sensor;
process the temperature measurement data after receiving the temperature measurement data;
determine whether the temperature measurement data indicates that a current temperature of the environment satisfies a threshold based on processing the temperature measurement data;
perform an action to control an operating state of the heating element based on determining whether the temperature measurement data indicates that the current temperature of the environment satisfies the threshold;
determine that the temperature sensor is malfunctioning;
cause the communication interface to receive the temperature information after determining that the temperature sensor is malfunctioning; and
perform an additional action to control the operating state of the heating element based on the temperature information.

11. The ATM device of claim 10, wherein the heating element includes an electric heater.

12. The ATM device of claim 10, wherein the heating element includes a lamp.

13. The ATM device of claim 10, further comprising:
a lower portion; and
a sensor component disposed at the lower portion of the ATM device and configured to detect a user's feet at the lower portion of the ATM device; and
wherein the one or more processors cause the heating element to turn on based on the sensor component detecting the user's feet at the lower portion of the ATM device.

14. The ATM device of claim 10, further comprising:
a motion sensor configured to detect motion in proximity of the ATM device; and
wherein the one or more processors cause the heating element to turn on based on the motion sensor detecting motion within a threshold distance from the ATM device.

15. A method, comprising:
receiving, by a device, temperature measurement data from a temperature sensor, or temperature information from an external server device,
the temperature sensor being disposed on or within an automated teller machine (ATM) device, and positioned to detect a temperature associated with a touch screen component of the ATM device;
processing, by the device, the temperature measurement data, or the temperature information, after receiving the temperature measurement data or the temperature information;
determining, by the device, whether the temperature measurement data, or the temperature information, indicates that a current temperature of the touch screen component satisfies a threshold based on processing the temperature measurement data or the temperature information;
setting, by the device, a heating element to turn on the heating element, or to turn off the heating element, based on determining whether the temperature measurement data, or the temperature information, indicates that the current temperature satisfies the threshold,
the heating element being disposed within the ATM device; and
providing, by the device, information regarding the temperature measurement data to the external server device for statistical analysis on temperature patterns.

16. The method of claim 15, wherein setting the heating element to turn on the heating element, or to off the heating element, comprises:
setting the heating element to turn on the heating element when the temperature measurement data, or the temperature information, indicates that the current temperature satisfies the threshold; and
wherein the method further comprises:
initiating a timer based on setting the heating element to turn on; and
setting the heating element to turn off based on expiration of the timer.

17. The method of claim 15, wherein the heating element is disposed proximate to a rear portion of the touch screen component within the ATM device, and oriented such that heat generated by the heating element is directed at the rear portion of the touch screen component.

18. The method of claim 17, wherein the ATM device includes a separator material disposed between the heating element and the rear portion of the touch screen component.

19. The method of claim 15, wherein the ATM device further comprises a card reading mechanism configured to read transaction cards; and
wherein the method further comprises:
controlling an operating state of the heating element based on a detection of a transaction card by the card reading mechanism.

20. The method of claim 19, wherein controlling the operating state comprises:
when the heating element is in an OFF state, maintaining the heating element in the OFF state if the card reading mechanism does not detect the transaction card.

* * * * *